United States Patent [19]

Quinville

[11] 4,185,558
[45] Jan. 29, 1980

[54] RE-ENTRY VEHICLE BOUNDARY LAYER TRANSITION SUPPRESSOR

[75] Inventor: James A. Quinville, Redlands, Calif.

[73] Assignee: The United States of America as represented by the Secretary of the Air Force, Washington, D.C.

[21] Appl. No.: 725,582

[22] Filed: Apr. 23, 1968

[51] Int. Cl.² .............................................. B64C 1/38
[52] U.S. Cl. .................................... 102/105; 244/160
[58] Field of Search ..................... 102/105; 244/117.1, 244/123, 160

[56] References Cited

U.S. PATENT DOCUMENTS 3,129,667    4/1964    Wen .................................... 102/105

Primary Examiner—Verlin R. Pendegrass
Attorney, Agent, or Firm—Joseph E. Rusz; Richard J. Killoren

[57] ABSTRACT

Boundary layer transition is delayed on a re-entry vehicle by making use of the differential pressure that normally exists between the surface of a re-entry vehicle and the base region of the vehicle. Choked flow orifices are provided on the surface of the vehicle at the input to the internal ducting leading to the base region of the vehicle.

1 Claim, 6 Drawing Figures

RE-ENTRY VEHICLE BOUNDARY LAYER TRANSITION SUPPRESSOR

BACKGROUND OF THE INVENTION

The re-entry of a vehicle into the atmosphere poses many problems which are difficult to overcome. For example, the re-entry of high ballistic parameter vehicles, which may be characterized by fairly sharp slender cones, encounters a serious problem of vehicle versus decoy discrimination. For weapon system applications, it is necessary to make the re-entry vehicle difficult if not impossible to observe to overcome the enemy defense system. Since a vehicle cannot be made completely invisible to defense systems, the use of decoys is important to increase the vehicle penetration capability. A serious problem in this respect occurs due to boundary layer transition.

A nonsuction re-entry vehicle with, for example, a length of 7 ft., will undergo boundary layer transition at an altitude of approximately 90,000 to 100,000 ft. A small nonsuction decoy would undergo boundary layer transition at a much lower altitude, perhaps 50,000 ft. When a re-entry vehicle undergoes transition, there is a resultant change in re-entry vehicle drag and hence in the vehicle velocity. The smaller decoy would not experience this change until it reaches a lower altitude. This differnce in relative velocity results in the so-called metric discriminant.

SUMMARY OF THE INVENTION

As a result, if the boundary layer transition can be delayed on the re-entry vehicle to much lower altitude, comparable to that of a decoy, then metric discrimination can be avoided. Of course, it may be desirable to apply suction on a decoy as well as a re-entry vehicle and prevent both vehicles from undergoing transition to an even lower altitude.

According to this invention, suction to control boundary layer transition is applied to a re-entry vehicle. This is accomplished by making use of the pressure differential which exists between the vehicle surface and the base region of the vehicle. A unique feature of the invention is the lack of any need for a mechanical suction pump or active flow control device. Use is made of fixed choked flow orifices at the input of an internal ducting system which will automatically provide the necessary metering of the boundary layer suction flow into the re-entry vehicle base region. The pressure differnce between the cone surface and the base region together with choking the flow through the surface provides an automatic altitude compensated pump for the suction flow.

Suction to maintain laminar flow has been used previously for laminar flow control on aircraft wings. However, in all previous systems, it was necessary to provide some means to provide the suction such as a mechanical pump.

Besides providing control of boundary layer transition, this device also affects the wake flow structure by ejection of the suction gases into the base region to help prevent doppler wake discrimination. This device can also be used to keep the vehicle surface from ablating at the higher altitudes and thus diminishes both optical and radar signatures.

DESCRIPTION OF THE PREFERRED EMBODIMENT

Figure 1:
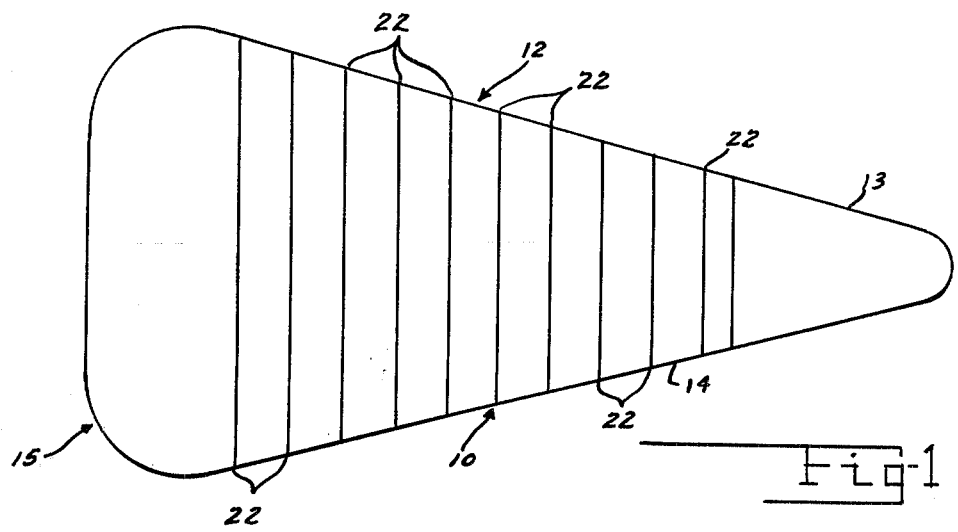
FIG. 1 is a side plan view of a re-entry vehicle according to the invention.
Figure 2:
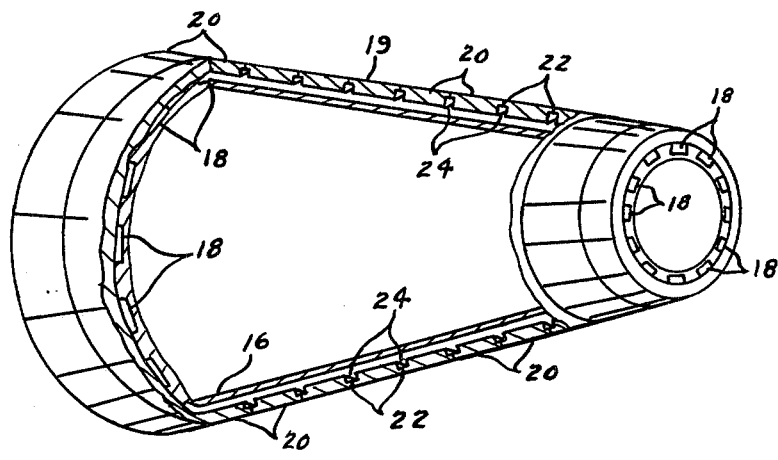
FIG. 2 is a partially cutaway isometric view of the device of FIG. 1 with the nose cone removed.

Reference is now made to FIGS. 1 and 2 of the drawing which show a re-entry vehicle 10 having a body secton 12 and a nose cone section 13. The body section 12 has a conical shaped surface 14 and a base region 15.

Figure 4:
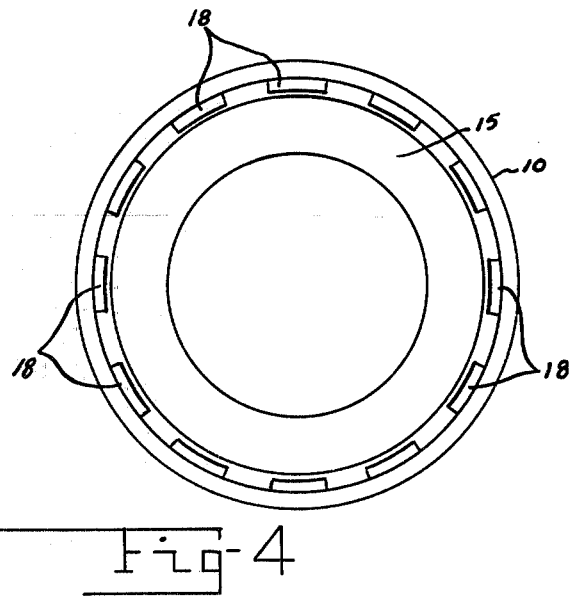
FIG. 4 is a rear end view of the device of FIG. 1.
Figure 3:
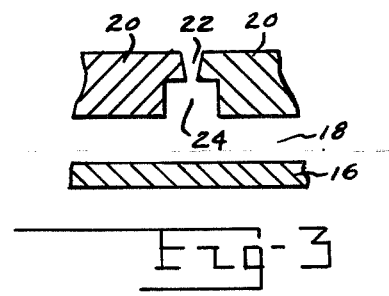
FIG. 3 is an enlarged sectional view of a slot orifice for the device of FIG. 1.

As shown in FIG. 2, the body section 12 has a conical shaped inner wall support member 16 having a plurality of longitudinal slots 18 along the outer surface. The slots 18 extend to the bse of the vehicle as shown in FIG. 4. An outer wall member 19, consisting of a plurality of conical shaped members 20, is secured to the outer surface of member 16 either with bolts or by welding, or other well-known means. The members 20 are spaced to form nozzle slot orifices 22 as shown in FIG. 3. The slot orifices are backed by slots 24 that feed into longitudinal slots 18. The slot size and spacing shown are merely illustrative. A typical model with a vehicle 7 ft. long and half angle of 8° might have 85 or more slots which start at about one foot from the nose end with ¾ inch spacing and with final spacings of one inch at the rear end of the vehicle. The slot width could lie in the range from 0.001" to 0.010". The slot depth for the internal ducting would be about 0.20".

While the use of slots have been described, a porous surface or holes could also be used.

Figure 5:
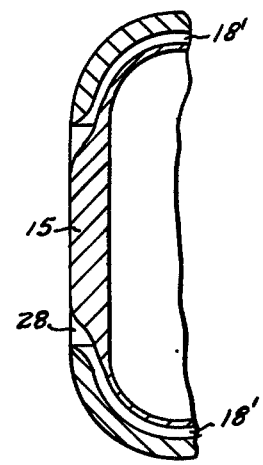
FIG. 5 is a rear end view of a modification of the device of FIG. 1.
Figure 6:
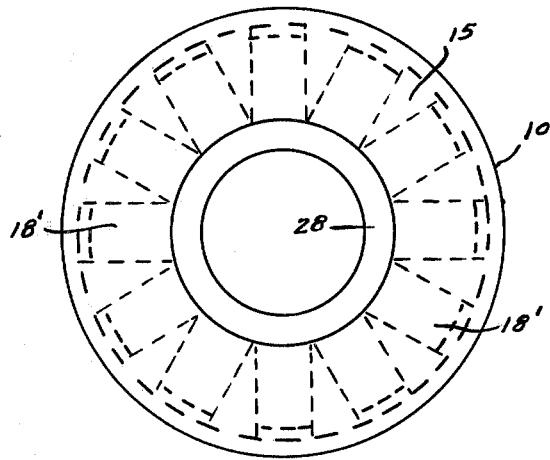
FIG. 6 is a partially cutaway sectional view of the device of FIG. 5.

The slots 18 may be brought out at the rear of the vehicle as shown in FIG. 4 or slots 18' may be brought together to a common exit aperture 28 as shown in FIGS. 5 and 6.

There is thus provided a system for delaying the boundary layer transition of a re-entry vehicle.

What is claimed is:

1. A system for delaying the boundary layer transition for a substantially conically shaped re-entry vehicle having a nose section, a body section and a base section wherein there normally exists a differential pressure between the boundary layer adjacent the conical surface of the body section and the base region of the vehicle during re-entry into the atmosphere, comprising: an inner wall member; an outer wall member, positioned over the inner wall member; internal duct means in the inner wall member, adjacent the outer wall member; said duct means being a plurality of longitudinal slots extending to the base region of the vehicle; said slots meeting in a common exit orifice at the base region of the vehicle means, including a plurality of annular nozzle orifices on the conical surface of said vehicle, for providing a choked flow of gases from the boundary layer into said duct means, whereby an automatic altitude compensated pump is provided for the suction flow of gases from the boundary layer to the base region of the vehicle.

* * * * *